United States Patent [19]

Fenn et al.

[11] E Re. 31,452

[45] Reissued Nov. 29, 1983

[54] QUICK-ACTING ELECTRIC CIGAR LIGHTER

[75] Inventors: Lawrence E. Fenn, Bridgeport; Charles R. Sperry, Westport, both of Conn.

[73] Assignee: Casco Products Division of Sun Chemical Corporation, Bridgeport, Conn.

[21] Appl. No.: 399,764

[22] Filed: Jul. 19, 1982

Related U.S. Patent Documents

Reissue of:

[64] Patent No.: 4,236,061
Issued: Nov. 25, 1980
Appl. No.: 12,882
Filed: Feb. 16, 1979

U.S. Applications:

[63] Continuation of Ser. No. 252,400, Apr. 9, 1981, abandoned.

[51] Int. Cl.[3] ..... F23Q 7/02

[52] U.S. Cl. ..... 219/265; 219/264; 219/267

[58] Field of Search ..... 219/260, 263, 264, 265, 219/266, 267, 270, 512; 200/48 A, 263, 265, 268, 269, 270; 337/386

[56] References Cited

U.S. PATENT DOCUMENTS

| | | | |
|---|---|---|---|
| 2,137,195 | 11/1938 | Cohen | 219/264 |
| 2,151,622 | 3/1939 | Sinko | 219/264 |
| 2,207,462 | 7/1940 | Kurtz | 219/265 |
| 2,207,601 | 7/1940 | Shakespeare et al. | 219/265 |
| 2,220,978 | 11/1940 | Shakespeare et al. | 219/265 |
| 2,503,103 | 4/1950 | Eskuchen | 219/264 |
| 2,637,799 | 5/1953 | Wood | 219/265 |
| 3,544,742 | 12/1970 | Frink | 200/48 A |
| 3,657,505 | 4/1972 | Mosele | 200/268 X |
| 3,760,150 | 9/1973 | Fenn et al. | 219/265 |
| 3,887,789 | 6/1975 | Pecota | 219/265 |
| 4,100,385 | 7/1978 | Wutz | 200/268 |
| 4,188,515 | 2/1980 | Patel et al. | 200/269 X |

FOREIGN PATENT DOCUMENTS

| | | | |
|---|---|---|---|
| 2755620 | 7/1978 | Fed. Rep. of Germany | 219/265 |
| 587169 | 4/1947 | United Kingdom | 200/263 |

*Primary Examiner*—Volodymyr Y. Mayewsky
*Attorney, Agent, or Firm*—Cynthia Berlow; H. Gibner Lehmann; K. Gibner Lehmann

[57] ABSTRACT

A quick-acting electric cigar lighter employing a bimetallic disk constituting an electric switching member. The disk is secured in place by a mounting stud, utilizing a welding procedure. The welding does not adversely affect the functioning of the switch due to the provision of a central offset portion in the disk, which tends to relieve stresses on the weld, preventing any failure at that location. The lighter is activated by pushing the igniting unit inward to bring the heating element cup into physical contact with the bimetallic disk. Overstressing of the bimetallic disk is prevented by mounting the same in a recessed insulating block which has lands that are engaged by the cup after a pre-determined amount of actuation of the plug has occurred. An effective, long-life contact between the cup and the disk is had by the use of special metals which co-act to minimize pitting, deterioration, etc., one metal comprising aluminum which cooperates with other metals such as copper or silver.

13 Claims, 13 Drawing Figures

20
28
50
86
80
74
64
66
34
30
38
68
60
46
72
48
70
84
58
62
56
32
52
54
36
78
26
82
76
22
24
44
42
40

20
28
50
86
80
74
64
30
70
34
38
60
46
84
48
72
58
62
56
32
52
54
36
78
82
76
26
22
68
24

20
28
50
86
80
76
74
30
70
34
38
60
46
84
48
72
62
56
52
32
36
78
26
22
68
24

Fig. 4
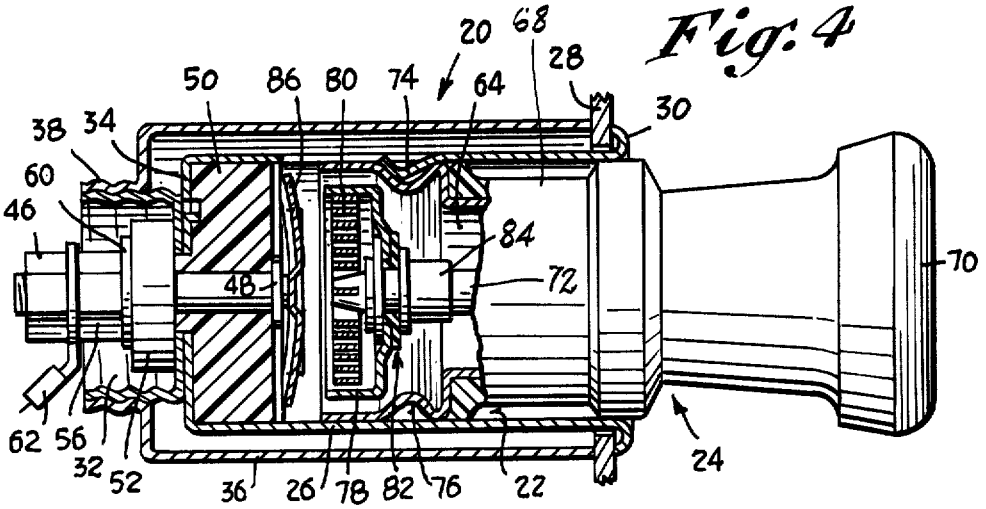
Fig. 5
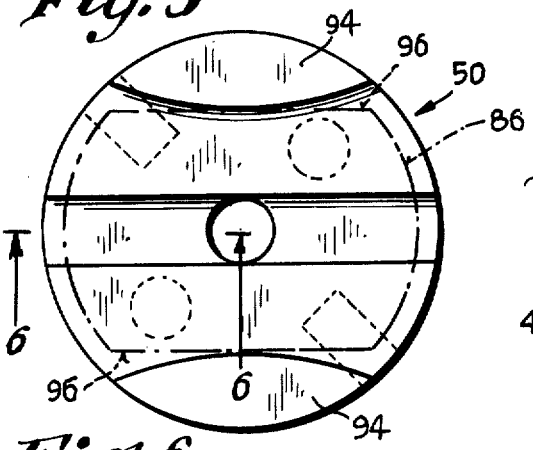
Fig. 10
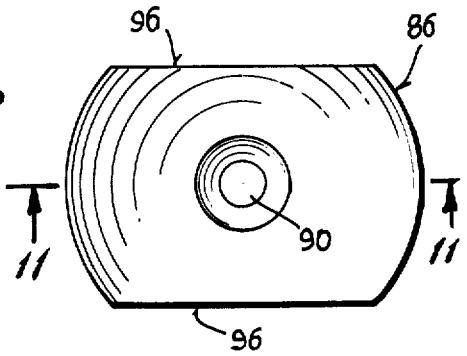
Fig. 8
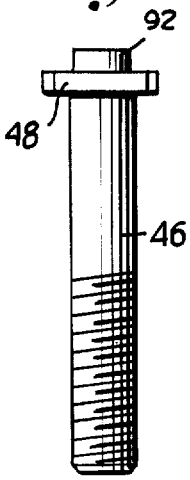
Fig. 6
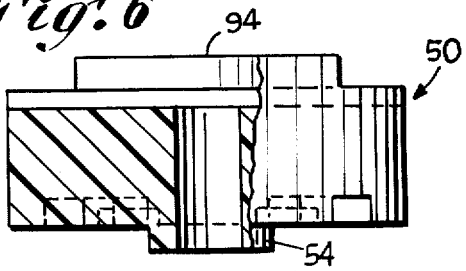
Fig. 11
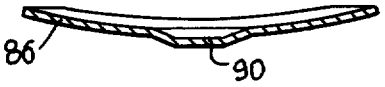
Fig. 7
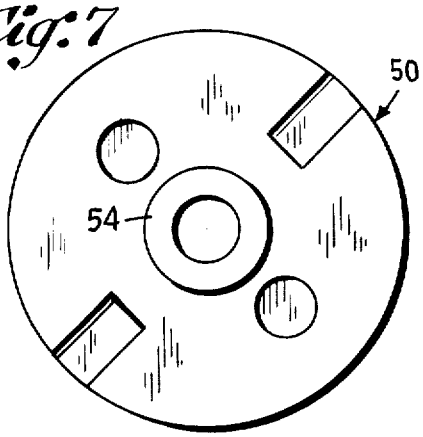
Fig. 9
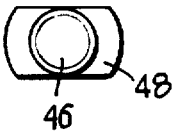
Fig. 12
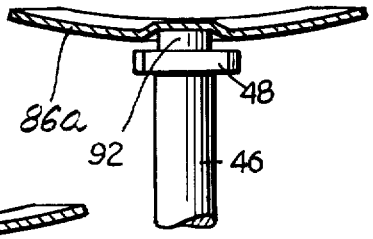
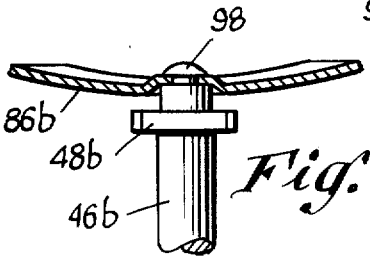
Fig. 13

QUICK-ACTING ELECTRIC CIGAR LIGHTER

Matter enclosed in heavy brackets [ ] appears in the original patent but forms no part of this reissue specification; matter printed in italics indicates the additions made by reissue.

*Cross References to Related Pending Applications*

*The present application is a continuation of our co-pending U.S. application Ser. No. 252,400 filed Apr. 9, 1981, and entitled Quick-Acting Electric Cigar Lighter, now abandoned. U.S. application Ser. No. 252,400 is a reissue application of U.S. Pat. No. 4,236,061 dated Nov. 25, 1980.*

BACKGROUND

This invention relates to quick-acting electric cigar lighters, and more particularly to lighters of this type, which utilize a bimetallic disk in the heating element circuit to control the energization of the element.

The invention involves improvements in the fast-acting electric cigar lighter described and claimed in U.S. Pat. No. 3,760,150 dated Sept. 18, 1973 and issued to Lawrence E. Fenn and Charles R. Sperry.

The quick-acting electric cigar lighter of this identified patent is believed to constitute the closest prior art to the present invention.

In the electric cigar lighter of the patent, an electric heating element that is carried in a contact cup, is mounted at the inner end of a removable igniting unit plug stored in the socket of a holder device. Such socket has contact members which provide for the energization of the heating element. The control of the circuit, involving a mechanical make-and-break arrangement, is effected by flexing of the bimetallic disk as it becomes heated. The condition of the disk when cool is such that peripheral portions thereof can be engaged by the heating element cup at the time that the igniting unit plug is depressed or forced inward. Also, the bimetallic disk, in effect, constitutes a large wall of a temporarily-formed chamber or enclosure containing the heating element, this occurring when the plug is depressed. In consequence, heat from the enerigized coil is transferred very quickly to the bimetallic disk, and as it flexes the peripheral portions thereof snap away from the circuit closing edge of the heating element cup, effectively opening the circuit through the element prior to excessive heating of the latter. The normal rating of the heating element is not sufficient to enable it to withstand for any considerable length of time the current which flows at the time that the igniting unit plug is held depressed. However, the operation of the bimetalic disk can be depended on to prevent overheating and burn-out of the heating element. In this patented fast-acting lighter, the possibility existed that pitting and deterioration of the contacts represented by the bimetallic disk and the cooperate edge of the heating element cup could occur. Also, there existed the possibility that extensive pressures, which might be applied to the igniting unit plug, would cause an undesirable deformation of the bimetallic disk, impairing its proper functioning and conceivably shortening the useful life of the cigar lighter. In addition, under circumstances of extended operation, the tendency existed for the headed joint on which the bimetallic disk depended for its support to fail, or for the disk to crack due to an excessive member of actuations beyond that normally encountered in what was considered to be a useful life.

While the above conditions did not of necessity render the fast-acting cigar lighter of the patent unsuitable for manufacture and sale, it was considered, as with numerous other manufactured products, that improvements could be realized, enhancing still further the desirable features of the lighter.

The conditions described above have been largely obviated by the present invention, which has for one objective the provision of an improved fast-acting electric cigar lighter of the kind described, wherein a greatly extended life of the electric contact means is had.

Another object of the invention is to provide an improved fast-acting electric cigar lighter as above characterized, wherein increased reliability is had in the functioning of the bimetallic disk-like member.

Yet another object of the invention is to provide an improved electric cigar lighter in accordance with the foregoing, wherein there is obviated the likelihood of over-stressing of the bimetallic disk member.

A feature of the invention resides in the provision of an improved fast-acting electric cigar lighter as above set forth, which is especially simple in its construction and economical to fabricate.

Another feature of the invention resides in the provision of an improved electric cigar lighter as characterized, which lends itself to simple, well-known and tested fabricating procedures which make possible mass production without involving costly and complicated machinery and equipment.

Still other features and advantages will hereinafter appear.

In accomplishing the foregoing objects, the invention provides a cigar lighter which utilizes, for the control of the circuitry, an electrical contact between edge portions of the heating element cup that is carried by the igniting unit plug, and a face of the bimetallic disk that snaps to open the circuit. On the two contacting surfaces, different metal are provided which considerably extend the useful life and minimize pitting and deterioration. One of said metals is aluminum, which is preferably provided on the edge of the heating element cup. Cooperating with the aluminum is a facing of copper on the bimetallic disk, and such facing can be of silver instead of copper, with equally good results. The aluminum has the effect of preventing pitting and deterioration when utilized with copper or silver, for example, as the cooperable companion metal.

At the center of the bimetallic disk an offset portion is provided, having reverse bends. The mounting stud has a head which is welded to the offset portion of the disk, and by virtue of the offset bends there are minimized the stresses that occur as the disk responds to heating and cooling, with the result that there is less likelihood of cracking of the disk or failure of the weld.

The bimetallic disk is carried in a mounting block constituted of ceramic or other suitable heat-resistent insulating material. The said block is recessed to receive the bimetallic disk, and has lands at opposite edges of the disk, which are engageable with edge portions of the heating element cup at the time that the igniting unit plug is depressed. Such engagement constitutes a positive stop, and prevents the imposing of excessive stresses on the disk, which would otherwise cause deformation and malfunctioning of the same.

A specific preferred embodiment of the invention will now be described in detail, with reference to the accompanying drawings wherein:

FIG. 4 is a view like that of FIG. 3 but showing the igniting unit plug as having returned to its normal storage position, while the bimetallic circuit control disk is still heated. The igniting unit plug is now ready for withdrawal and use.

FIG. 5 is a plan view of the insulating mounting block for the bimetallic disk.

FIG. 6 is a fragmentary section taken on the line 6—6 of FIG. 5.

FIG. 7 is a plan view of the reverse face of the mounting block for the bimetallic disk.

FIG. 8 is a side elevational view, enlarged, of the mounting stud for the bimetallic disk.

FIG. 9 is an end elevational view of the mounting stud of FIG. 8.

FIG. 10 is a plan view of the bimetallic circuit control disk with central, offset mounting portion.

FIG. 11 is a section taken on the line 11—11 of FIG. 10.

FIG. 12 is a sectional view of a bimetallic circuit-control disk made according to the invention and illustrating another embodiment thereof.

FIG. 13 is a view like that of FIG. 12, but illustrating another embodiment of the invention wherein the bimetallic disk is riveted to its supporting stud.

Figure 1:
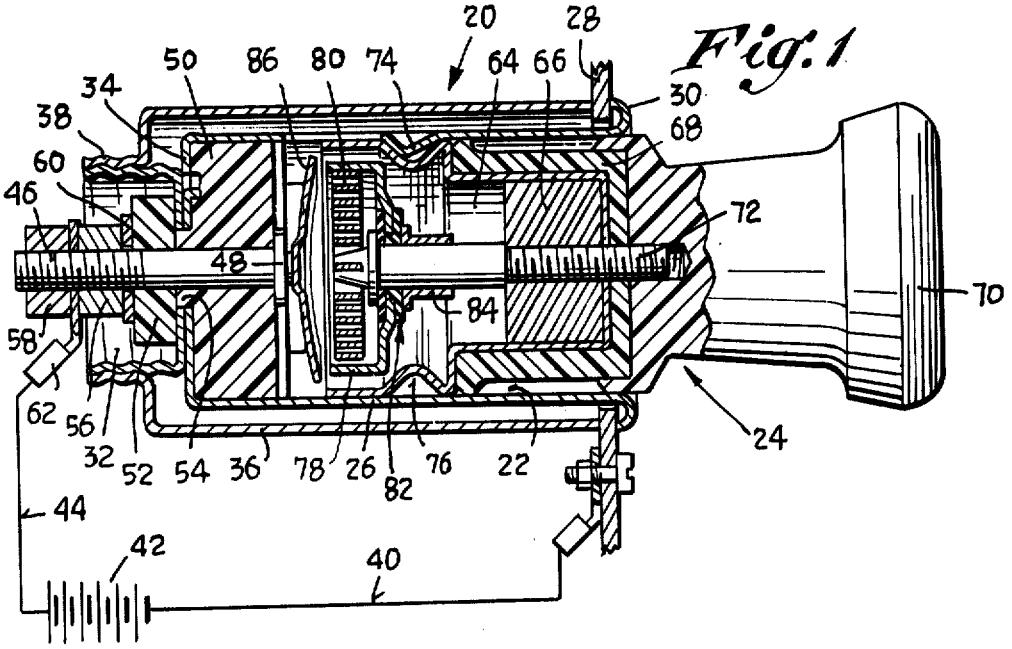
FIG. 1 is an axial sectional view of an improved fast-acting electric cigar lighter made in accordance with the invention, the igniting plug unit being shown in the shallow, un-energized position in the socket of the holder device.

Referring first to FIGS. 1-4, the improved, quick-acting electric cigar lighter shown therein comprises a holder device indicated generally by the numeral 20, presenting a socket 22 in which there is removably carried an igniting unit plug 24. The holder device 20 comprises a tubular metal shell 26 adapted to extend through an opening in a metal supporting panel 28, said shell having an annular bezel 30 engaging the front of the panel to constitute an abutment and support.

At its back end, the holder shell 26 has a threaded cup 32 which is secured to the transverse wall 34 of the shell and which accomodates a clamping sleeve 36 adapted to engage the rear surface of the panel 28, to mount the shell. The clamping sleeve 36 has an end portion 38 of reduced diameter, which is threaded to cooperate with the threads of the cup 32.

The panel 28 constitutes the ground circuit for energizing the cigar lighter, and is shown as being connected by a wire 40 to an energizing battery 42 whose other terminal is connected by a wire 44 to a threaded stud 46 that is carried by the rear wall 34 of the holder shell 26. The stud 46 has a head portion 48 of enlarged diameter, which clamps against an insulating mounting block 50 that snugly sits in the bottom of the holder shell 26. The stud 46 passes through a central opening in the mounting block 50, and also passes through aligned openings in the rear wall 34 of the holder shell, and in the screw cup 32. In the cup 32 there is an insulating washer 52 carried by the stud 46, which is clamped against the bottom wall of the threaded cup 32 and against a raised central portion or boss 54 of the mounting block, as by means of a pair of nuts 56, 58 acting against a metal washer 60 which engages the insulating washer 52. A terminal lug 62 is disposed between the nuts 56, 58 and serves to effect the connection to the wire 44.

By the above construction it is seen that the holder device 20 presents two contacts which are available for energizing the removable igniting unit plug 24. One such contact is the holder shell 26, whereas the other contact involves the mounting stud 46 with its head portion 48.

The removable igniting unit plug 24 comprises a tubular metal plug body 64 which is clamped between a metal annulus 66 and a cup-shaped member 68 shown as of insulating material. A knob 70 is threaded onto a shouldered current-carrying stud 72, so as to pull up the annulus 66 tightly in the plug body 64. An electrical circuit is thus established between the stud 72 and the plug body 64.

The shell 26 of the holder device has a plurality of lanced spring contact fingers 74 engageable in an annular groove 76 in the exterior of the body 64, thereby to normally yieldably hold the igniting plug in a shallow, storage position wherein it is not energized.

The threaded stud 72 mounts a heating element cup 78, and has its inner end slotted to receive the innermost convolution of a spiral heating coil 80, to which it is welded. The outermost convolution of the heating coil 80 is welded to the metal cup 78, which latter is insulated from the threaded stud 72 by insulating washers designated generally by the numeral 82, clamped by a sleeve 84 on the stud.

Thus, by the above construction, the innermost end or convolution of the heating coil 80 is electrically connected, through the stud 72, annular 66 and plug body 64, and through the lanced spring fingers 74 to the holder shell 26 which latter is electrically connected in turn to the panel 28 and battery lead 40.

In the other part of the circuit, the battery lead 44 connects through the terminal lug 62 to the terminal stud 46 with its enlarged head 48.

Figure 2:
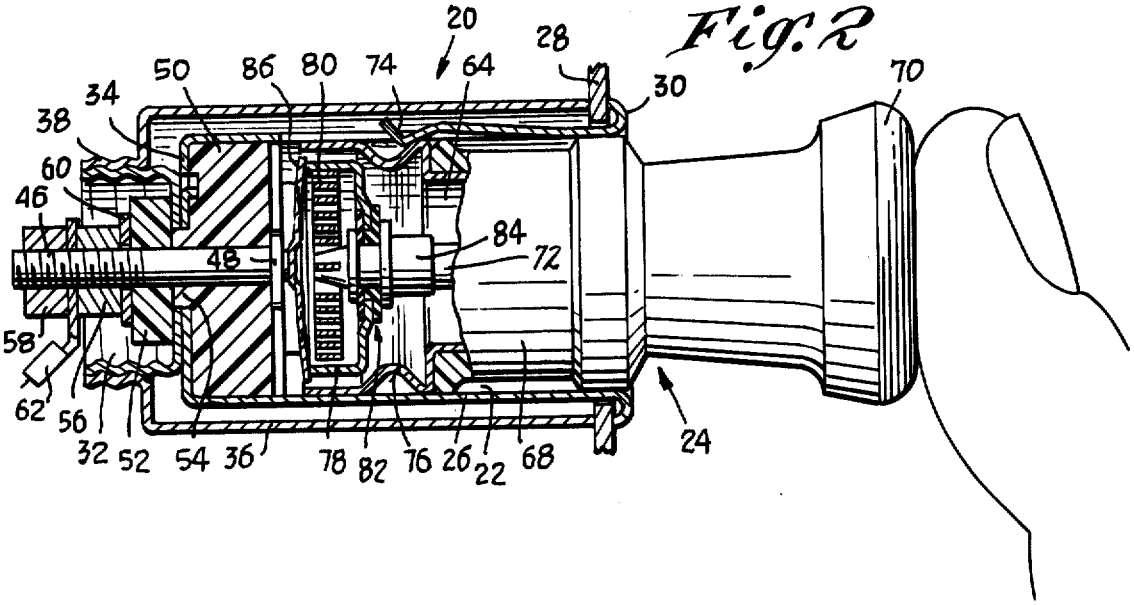
FIG. 2 is a view like that of FIG. 1 but showing the igniting unit plug as having been pushed in or depressed, resulting in a closing of the circuit to the heating element, via the bimetallic circuit-controlling disk.
Figure 3:
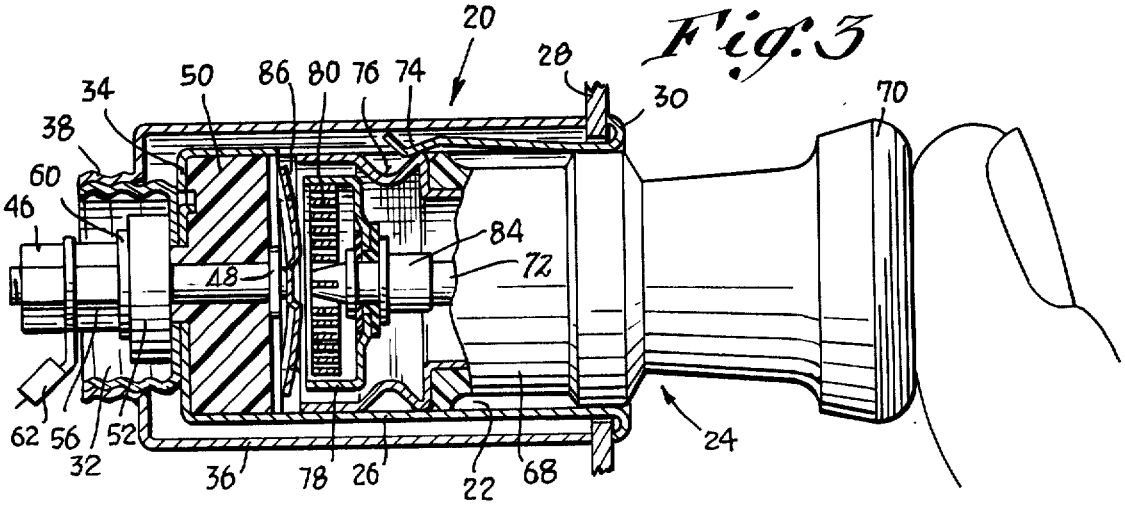
FIG. 3 is a view like that of FIG. 2 but showing the bimetallic disk in its heated, snapped-away position wherein it disengages the edges of the heating element cup so as to break the circuit through the element in response to the quick heating of the latter.

To complete the circuitry of the lighter for energizing the coil 80 and to effect a fast-acting and positive opening of the circuit, there is provided a bimetallic snap-disk 86 which is mounted on the head portion 48 of the stud and which is adapted to contact the edge portions of the heating element cup 78 at the time that the igniting unit plug 70 is depressed or pushed into the socket 22 of the holder device. This engagement is illustrated in FIG. 2, and effects a closing of the circuit through the heating element 80 whereby it quickly heats to incandescence. The heat is also quickly transmitted to the circuit control disk 86, causing such disk to snap to a position of reverse curvature as illustrated in FIG. 3. This results in the circuit being broken between the disk 86 and the edge of the heating element cup 78.

In the prior patented cigar lighter identified above, the bimetallic disk was apertured and secured to the mounting stud by heading of the latter on the disk. It was found, however, that after thousands of operations the disk could occasionally crack at the mounting aperture.

In accordance with the present invention, the bimetallic disk 86 is not apertured but instead is provided with a laterally offset center portion 90, and such center portion is securely welded to a nib 92 provided on the head portion 48 of the terminal 46.

By the provision of the offset portion 90, annular areas of reverse curvature occur at the center of the disk, surrounding the welded central portion, and as presently understood such portions of reverse curvature relieve excessive stresses which would otherwise occur at the weld and impair the integrity of the same; at the same time the reversely curved portions minimize the likelihood of cracking of the bimetallic disk. The off-setting of the disk can occur to provide a protuberance at the convex side when the disk is in the cold condition as illustrated in FIG. 11, or else at the concave side of the disk when the latter is cold, as illustrated in FIG. 12, with the disk 86a.

Further, in accordance with the present invention, improved electrical contact characteristics are obtained between the bimetallic disk 86 and the edge of the cup 78 by utilizing as one of the contacting metals, the metal aluminum. Preferably, the aluminum is carried by the edge of the heating element cup 78. Cooperating with the aluminum is a copper surface on the bimetallic disk 86 and we have found that a silver surface on the disk 86 will work essentially equally well, as compared with the copper surface. According to our understanding, it is of importance to utilize the aluminum as one of the contacting metals. The aluminum could also be in the form of a coating on the bimetallic disk 86, and the copper or silver could be provided on the cooperable edge of the heating element cup 78.

As provided by the present invention, the mounting block 50 is provided with a recess in which the bimetallic disk 86 is received, and has raised land portions 94 disposed on opposite sides of straight edge portions 96 of the disk. The raised land portions 94 are adapted for engagement with the edges of the heating element cup 78 so as to constitute a positive stop, preventing overtravel of the igniting unit plug inward beyond the position required to effect the proper engagement with the bimetallic disk. Therefore, overstressing of the disk is prevented, which could otherwise occur if no positive restriction was placed on the inward movement of the igniting unit plug and heating element cup.

The above features result in greatly improved performance in cigar lighters of the type illustrated herein. Not only is there increased contact life with much less deterioration of the contacting areas, but also there is less tendency for the disk to fail due to cracking, as well as less tendency for the welded mounting of the disk to rupture. The disk will have a normal response to heating over an extended period of use, since it cannot be overstressed mechanically for excessive forces impressed by the user on the igniting unit plug.

FIG. 13 illustrates another embodiment of the invention, wherein a bimetallic disk 86b is provided with a central aperture to receive the reduced end portion of a supporting stud 46b, thereby to enable a rivet head 98 to be formed so as to rivet the disk to the stud. If desired, a washer (not shown) can be provided under the rivet head 98, better to equalize stresses on the disk. The stud 46b has a locating shoulder 48b, as shown, and the assemblage of FIG. 13 can be utilized in place of the assemblage of FIG. 12, as will be understood.

Variations and modifications of the invention are possible within the scope of the appended claims.

We claim:

1. An instant electric cigar lighter of the type having a heating coil energized from a source of current, comprising in combination:

(a) a holder device presenting a socket, (b) an igniting unit plug receivable in and removable from the socket of the holder device, (c) said igniting unit plug having an electrical resistance heating coil adapted to be electrically energized and presenting an exposed face for igniting cigarettes, cigars and the like, (d) a snap-type bimetallic member of dished configuration, said member having flexing portions and being adapted to be disposed in close heating-receiving relation to the heating coil of the igniting unit plug, said member being disposd in the socket of the holder device and having a laterally offset mounting portion which is surrounded by the flexing portions of the member, (e) a mounting stud carried by the holder device, having a head portion which is welded against the laterally offset portion of the bimetallic member at locations which are spaced from the bends of the laterally offset portion whereby flexing and snapping of the bimetallic member is characterized by reduced strains and stresses at the weld areas, by virtue of the existence of said bends at the laterally offset portion of the member.

2. The invention as defined in claim 1, in which the laterally offset portion of the bimetallic member projects from the convex face of the member when the latter is cold.

3. The invention as defined in claim 1, in which the laterally offset portion of the bimetallic member projects from the concave face of the member when the latter is cold.

4. The invention as defined in claim 1, in which the bimetallic member is partially circular and has a pair of oppositely located substantially straight edges which are essentially parallel to each other.

5. An instant electric cigar lighter of the type having an electrical resistance heating coil energized from a source of current, comprising in combination:

(a) a holder device presenting a socket, (b) an igniting unit plug receivable in and removable from the socket of the holder device, (c) said igniting unit plug having the said heating coil adapted to be electrically energized and presenting an exposed face for igniting cigarettes, cigars and the like, (d) a snap-type bimetallic member of dished configuration, adapted to be disposed in close heating-receiving relation to the heating coil of the igniting unit plug, said member being disposed in the socket of the holder device, (e) a mounting stud carried by the holder device, having a heat portion which is secured to the bimetallic member and which mounts it in said socket, (f) said bimetallic member having a partially circular configuration and being characterized by a pair of oppositely-located substantially straight edges, (g) a recessed mounting block of heat-resistant insulating material, disposed in said socket and carrying said mounting stud, (h) said bimetallic member being disposed in the recess of said mounting block, (i) said mounting block being characterized by a pair of oppositely-disposed raised lands which define the recess thereof, (j) said igniting unit plug including a cup in which the heating coil is disposed, said cup having its edges arranged for engagement with the bimetallic member to close the circuit through the heating coil.

(k) said lands being located alongside the straight edges of the bimetallic member and being adapted for engagement by the edge of the heating coil cup to constitute a stop for the igniting unit plug when the latter is depressed, thereby to avoid excessive strain on the bimetallic member.

6. The invention as defined in claim 5, in which the lands of the mounting block having opposite convex edges which define them, said block being of circular shape.

7. An instant electric cigar lighter of the type having an electrical resistance heating coil energized from a source of current, comprising in combination:

(a) a holder device presenting a socket, (b) an igniting unit plug receivable in and removable from the socket of the holder device, (c) said igniting unit plug having the said heating coil adapted to be electrically energized and presenting an exposed face for igniting cigarettes, cigars and the like, (d) a snap-type bimetallic member of dished configuration, adapted to be disposed in close heating-receiving relation to the heating coil of the igniting unit plug, said member being disposed in the socket of the holder device, (e) a mounting stud carried by the holder device, having a head portion which is secured to the bimetallic member and which mounts it in said socket, (f) said igniting unit plug including a cup in which the heating coil is disposed, said cup having its edges arranged for engagement with a face of the bimetallic member to close the circuit through the heating coil, (g) said cup and bimetallic member being characterized by cooperable contact surfaces one of which is aluminum whereas the other is copper.

8. An instant electric cigar lighter of the type having an electrical resistance heating coil energized from a source of current, comprising in combination:

(a) a holder device presenting a socket, (b) an igniting unit plug receivable in and removable from the socket *of the* holder device, (c) said igniting unit plug having the said heating coil adapted to be electrically energized and presenting an exposed face for igniting cigarettes, cigars and the like, (d) a snap-type bimetallic member of dished configuration, adapted to be disposed in close heating-receiving relation to the heating coil of the igniting unit plug, said member being disposed in the socket of the holder device, (e) a mounting stud carried by the holder device, having a head portion which is secured to the bimetallic member and which mounts it in said socket, (f) said igniting unit plug including a cup in which the heating coil is disposed, said cup having its edges arranged for engagement with a face of the bimetallic member to close the circuit through the heating coil, (g) said cup and bimetallic member being characterized by cooperable contact surfaces one of which is aluminum whereas the other is silver.

9. The invention as defined in claim 8, in which the heating coil cup has the aluminum contact surface.

10. The invention as defined in claim 7, in which the heating coil cup has the aluminum contact surface.

11. The invention as defined in claim 7, in which the bimetallic member has the aluminum contact surface.

12. The invention as defined in claim [1] *7*, wherein the mounting stud is welded to the laterally offset portion of the bimetallic member.

13. The invention as defined in claim [1] *7*, in which the mounting stud is headed over on the laterally offset portion of the bimetallic member.

* * * * *